United States Patent [19]

Morino

[11] Patent Number: 4,676,328

[45] Date of Patent: Jun. 30, 1987

[54] FOOD WEIGHT MEASURING DEVICE FOR COOKING APPARATUS

[75] Inventor: Taisuke Morino, Suita, Japan

[73] Assignee: Sharp Kabushiki Kaisha, Osaka, Japan

[21] Appl. No.: 781,659

[22] Filed: Sep. 30, 1985

[30] Foreign Application Priority Data

Oct. 18, 1984 [JP] Japan ............................ 59-157970[U]
Oct. 18, 1984 [JP] Japan ............................ 59-157971[U]

[51] Int. Cl.[4] ........................ G01G 19/52; G01G 3/14; H05B 6/64
[52] U.S. Cl. ................................ 177/144; 177/210 C; 177/245; 219/10.55 B
[58] Field of Search ................... 177/210 C, 245, 144; 219/10.55 B

[56] References Cited

U.S. PATENT DOCUMENTS

| 3,813,918 | 6/1974 | Moe | 219/10.55 R X |
|---|---|---|---|
| 4,308,929 | 1/1982 | Estavoyer | 177/210 C |
| 4,382,479 | 5/1983 | Lee et al. | 177/210 C X |
| 4,390,768 | 6/1983 | Teich et al. | 219/10.55 R X |
| 4,521,658 | 6/1985 | Wyland et al. | 177/144 X |
| 4,582,152 | 4/1986 | Gibbons | 177/210 C |

Primary Examiner—George H. Miller, Jr.
Attorney, Agent, or Firm—Birch, Stewart, Kolasch & Birch

[57] ABSTRACT

A food weight measuring device including a turntable for carrying a foostuff, a supporting shaft for supporting the turntable, a detector for detecting the amount of change in a thrust direction of the turntable supporting shaft, responsive to the weight of the food, a converter for converting the amount of change amount in a thrust direction of the turntable supporting shaft to a change in the electrostatic capacity, and means for preventing liquid or dust from contaminating to the coverter.

6 Claims, 4 Drawing Figures

FOOD WEIGHT MEASURING DEVICE FOR COOKING APPARATUS

BACKGROUND OF THE INVENTION

The present invention relates to a food measuring device and, more particularly, to a food weight measuring device for a cooking apparatus such as microwave oven which can exactly measure the weight of food disposed in a heating chamber based on a change in electrostatic capacity. The present invention further relates to the construction of a food weight measuring device which prevents liquid or dust from being introduced into the food weight measuring device.

In a microwave oven of the prior art related to the present invention, a food weight measuring device is provided with a turntable mechanism in a heating chamber so as to measure the weight of food disposed on the turntable. The food weight measuring device is provided for automatically heating the food based on the weight of food, and automatically carries out the weight measuring operation when the food is disposed on the turntable. For example, a food weight measuring device is disclosed in U.S. patent application Ser. No. 724,072 filed on Apr. 16, 1985, now U.S. Pat. No. 4,615,405, entitled "FOOD WEIGHT MEASURING DEVICE FOR COOKING APPLIANCE" by Taisuke MORINO et al. The British counterpart is application No. 8509781 filed on Apr. 17, 1985, and the counterpart in West Germany is application No. P3514505.6 filed on Apr. 20, 1985.

However, if liquid such as water, coffee etc. is dropped on the turntable, the dropped liquid may flow into a shaft bearing, a condenser portion and an electrode portion of the food weight measuring device via a turntable shaft. This liquid damages the measuring operation so that the weight of the food cannot be exactly measured by the device. Because the weight of the food cannot be exactly measured, the desired heating operation cannot be automatically selected and cannot be carried out. Also, fine dust may invade the food weight measuring device, so that the weight of food cannot be exactly measure.

Accordingly, it is desired that a novel food weight measuring device be provided to exactly measure the weight of the food stored on the turntable even when liquid is dropped on the turntable and dust is present from the surrounding.

SUMMARY OF THE INVENTION

Accordingly, it is an object of the present invention to provide an improved food weight measuring device which can exactly measure the weight of the food without the adverse influence of liquid or dust.

It is another object of the present invention to provide an improved food weight measuring device for a heating apparatus which can exactly measure the weight of the food disposed on a turntable even when liquid is dropped on the turntable.

It is still another object of the present invention to provide an improved food weight measuring device for a heating apparatus which can prevents liquid or dust from flowing or otherwise being introduced into the food weight measuring device.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a food weight measuring device for a heating apparatus detects the weight of food disposed on a turntable in a heating chamber, as a changing amount, in the thrust direction of a supporting axis of the turntable. The changing amount in the thrust direction is converted to a change in the amount of electrostatic capacity determined by a space between electrode plates provided on an underside portion of the turntable supporting axis. Therefore, the weight of the food is detected by the change in the electrostatic capacity. To prevent liquid or fine dust from flowing into the food weight measuring device, the sectional view of one of the electrode plates will show that it is formed in a "U" shape. In other words, one of the electrode plates is formed in a box-like shape having an opening in the lower direction. The other electrode plate is stored in the cavity of the box-like electrode plate. The construction of the electrode plates enables a suitable detection of the change in the electrostatic capacity between the electrode plates even when liquid is droped on the turntable or in the heating chamber. In the embodiment of the present invention, a liquid cut-off plate may be provided on the turntable supporting axis so as to prevent the liquid dropped in the heating chamber from being introduced into the axis bearing portion or the electrode plates of the food weight measuring device through the turntable bearing portion.

BRIEF DESCRIPTION OF THE DRAWINGS

The present invention will be better understood from the detailed description given hereinbelow and the accompanying drawings which are given by way of illustration only, and thus are not limitative of the present invention and wherein.

DETAILED DESCRIPTION OF THE EMBODIMENTS

The food weight measuring device according to a preferred embodiment of the present invention as applied to a microwave oven of the turntable type will now be described with reference to FIGS. 1 through 5. The present invention may be applied to various apparatus other than the microwave oven.

Figure 1:
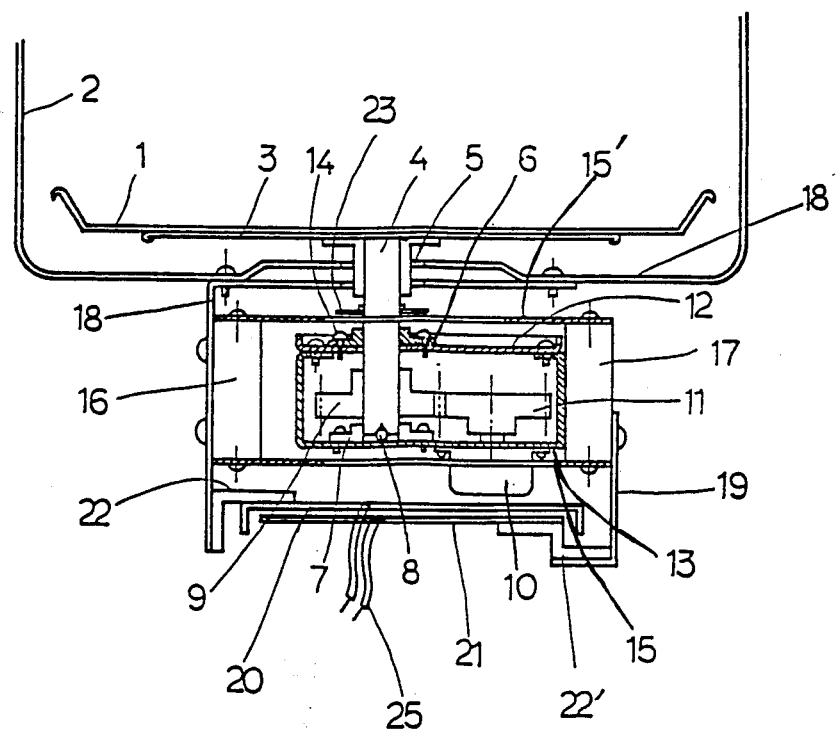
FIG. 1 shows a sectional view of a food weight measuring device disposed in a microwave oven according to an embodiment of the present invention.

FIG. 1 shows a sectional view of a food weight measuring device provided with a microwave oven. A turntable 1, preferably, formed in a circular dish-like shape, is provided on an inside bottom portion of a heating chamber 2, and is rotated when food disposed on the turntable 1 is heated. The turntable 1 is disposed on a turntable seat plate 3 formed in a circular configuration. Other components for the microwave oven such as a magnetron, a heater, or a cooling fan (not shown) or the like are provided in a housing case of the microwave oven with the turntable 1 and the turntable seat plate 3.

A turntable supporting shaft 4 projects from a center portion of the inside bottom wall of the heating chamber 2 through an opening 5 disposed on the bottom wall, and is fixedly connected to the center portion of the under surface of the turntable seat plate 3. The other end of the turntable supporting shaft 4 is extended in the under direction of the heating chamber 2. The turntable shaft 4 is rotatably supported by an upper bearing 6, a lower bearing 7, and a ball 8 disposed on the end of the turntable shaft 4. A gear 9 is fixed to the turntable shaft 2 to thereby unrotate the gear 9 without any slip. When the heating is carried out, the gear 9 is engaged with a driving gear 11 of a motor 10 so as to rotate the gear 9.

The upper bearing 6 is fixed to an upper support plate 12 by nuts 14, and the lower bearing 7 is fixed by nuts 14 to a box-like lower support plate 13 having an opening in the upper direction. The sectional view of the lower support plate 13 has a "U" shape configuration. The motor 10 also is fixed to the box-like lower support plate 13 by nuts 14.

Both opposing ends of plate spring 15 and 15' bind the ends of spring fixing members 16 and 17 from the upper and lower directions. In other words, the spring fixing members 16 and 17 are sandwiched between the ends of the plate springs 15 and 15', respectively.

The spring fixing member 16 is fixed to a fix electrode attach plate 18. The fix electrode attach plate 18, which is formed in an "L" shape, is tightly fixed to the bottom wall of the heating chamber 2. The spring fixing plate 17 is fixed to the upper support plate 12 and the lower support plate 13, and further is fixed to an "L" shaped movable electrode attach plate 19. The movable electrode attach plate 19 is shifted in the upper and lower directions in proportion to a load applied to the turntable shaft 4 based on a Roberval mechanism principle around the side of the fix electrode attach plate 18 as a fulcrum by the plate springs 15 and 15'.

A fix electrode plate 20 is horizontally disposed on the under portion of the fix electrode attach plate 18 via an insulating member 22. A movable electrode plate 21 is disposed on the under portion of the movable electrode attach plate 19 via an insulating member 22', and is opposite to the fix electrode plate 20. The movable electrode plate 21 is provided under the fix electrode plate 20.

Figure 2:
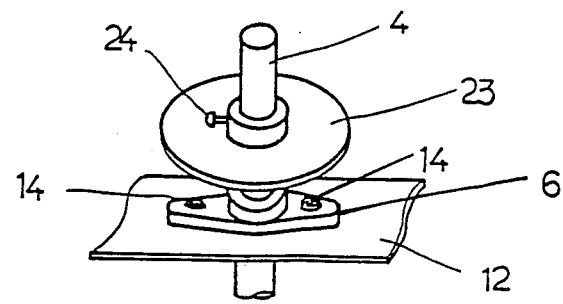
FIG. 2 shows a view of a liquid cut-off plate disposed on a turntable supporting axis to prevent liquid from being introduced into the food weight measuring device.
Figure 3:
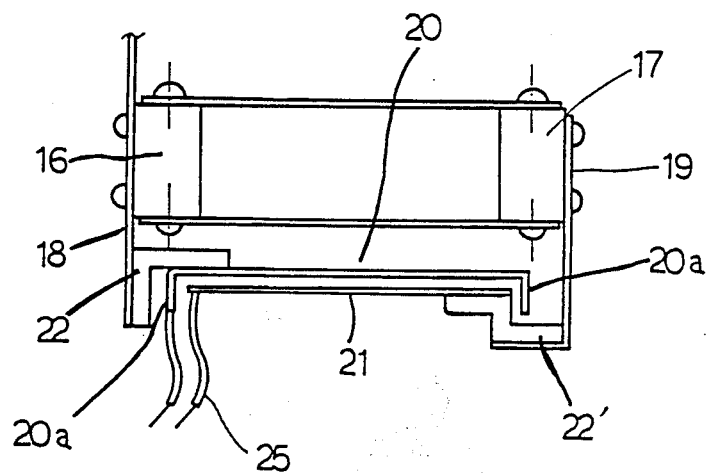
FIG. 3 shows an enlarged sectional view of a electrode plate portion of a food weight measuring device according to an embodiment of the present invention.

A liquid cut-off plate 23, which, preferably, is formed in a circuir shape, is provided on the turntable shaft 4, and is positioned on the upper bearing 6. As shown in FIG. 2, a connecting collor of the liquid cut-off plate 23 is fixed to the turntable shaft 4 by a nut 24. To perfectly prevent liquid from being introducing into the lower portion through the turntable shaft 4, the space between the liquid cut-off plate 23 and the turntable shaft 4 is sealed. The shape of the liquid cut-off plate should not be limited to a circular shape.

To prevent the liquid which may be dropped from the circumference of the liquid cut-off plate 23 from flowing into a space between the fix electrode plate 20 and the movable electrode plate 21, the circumferential edge of the fixed electrode plate 20 is bent in the lower direction to form a liquid cut-off wall 20a. Therefore, the fix electrode plate 20 is formed in a box-like shape and has a cavity opened in the lower direction. In other words, the sectional view of the fix electrode plate 20 is a "U" shape. The movable electrode plate is substantially flat. The movable electrode plate 21 is stored in the cavity of the fix electrode plate 20. Thus, even when the liquid such as water, coffee, milk or the like contacts the fix elextrode plate 20, the liquid flows on an upper surface of the fix electrode plate 20, and then falls along the liquid cut-off wall 20a. Accordingly, the liquid does not flow and is not accumulated between the fix electrode plate 20 and the movable electrode plate 21.

The fix electrode plate 20 and the movable electrode plate 21 are connected to lead lines 25 and 25', respectively. The other ends of the lead lines 25 and 25' are connected to an oscillator to obtain an oscillating frequency in response to the food disposed on the turntable.

The operation of the food weight measuring device according to an embodiment of the present invention will now be described. When the food to be heated is disposed on the turntable 1, the plate spring 15 and 15' are bent in the lower direction by the weight of the food. In accordance with the change in the position of the plate springs 15 and 15', the movable electrode attach plate 19 is moved downwardly or shifted downwardly to extend or widen the space between the fix electrode plate 20 and the movable electrode plate 21. The electrostatic capacity C between the fix electrode plate 20 and the movable electrode plate 21 is reduced based on the following relationship.

$$C = \epsilon \cdot (S/d)$$

"S" designates an electrode plate opposing area, "d" designates the space between the fix electrode plate 20 and the movable electrode plate 21, and $\epsilon$ designates a dielectric constant. The electrostatic capacity C is converted to a frequency by the oscillator connected to the electrode plates 20 and 21 so as to measure the weight of the food. Therefore, the frequency responsive to the weight of the food can be outputted from the oscillator.

As described above, the fix electrode plate 20 is formed in a box-like shape, and the movable electrode plate 21 is stored into the cavity of the fix electrode plate 20. Even when the liquid such as water, coffee, or milk is dropped in the heating chamber 2 and introduced in the lower direction via the turntable shaft 4, the liquid which falls on the upper surface of the fix electrode plate 20, falls from the liquid cut-off wall 20 along the circumference of the fix electrode plate 20. Accordingly, the liquid is not applied and does not accumulate between the fix electrode plate 20 and the movable electrode plate 21, and thus the weight measuring mechanism can properly operate to obtain the correct weight of the food.

The above construction of the electrode plate portion prevents the fine dust introduced with the cooling air for the transformer, the magnetron or the like from accumulating between the fix electrode plate and the movable electrode plate. Therefore, the weight measuring is not influenced by the fine dust, and thus the weight of the food can be measured exactly.

Although, in the present embodiment, the fix electrode plate is formed in a box-like shape having an opening, a movable electrode plate may also be formed in the box-like shape having an opening.

Figure 4:
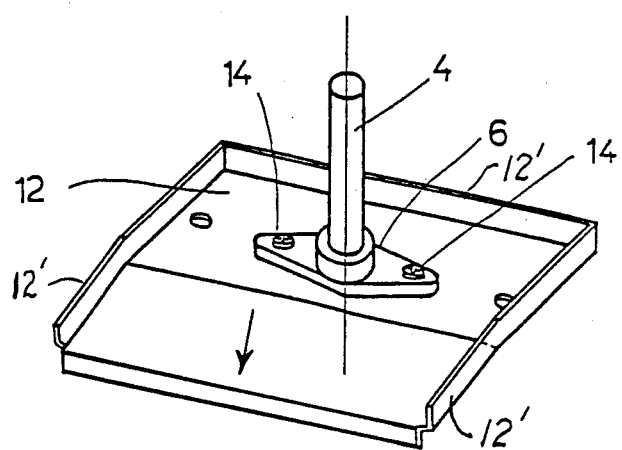
FIG. 4 shows a perspective view of an upper support plate of a food weight measuring device according an embodiment of the present invention.

Furthermore, to prevent the introduction of liquid into the weight measuring device, the upper support plate 12 is formed as shown in FIG. 4. The upper support plate 12 receives the liquid falling from the circumference edge of the liquid cut-off plate 23 so that the liquid is not deposited on the fix electrode plate 20 and the movable electrode plate 21, but rather the liquid is channeled in a direction so as to exhaust the liquid from a portion which is not applied the liquid to the electrode plates.

If the upper support plate 12 is formed as shown in FIG. 4, all of the electrode plates are not covered by the upper support plate 12. The upper support plate 12 prevents the liquid from being deposited onto the electrode plates.

The upper support plate 12 may be formed as follows. When the upper support plate 12 is a square, a vertical wall 12' is formed on three of the upper sides thereof for cutting off the liquid. The liquid which falls on the surface of the upper support plate 12 is introduced on the remaining side of the upper support plate 12, and flows in the direction of the arrow. The shape of the upper plate 12 should not be limited to the above configurations. For example, the liquid cut-off wall may be formed on the circumference of the upper support plate 12. The exhaust hole may be provided on the plate 12. The liquid on the plate 12 is introduced to the outside through a hole and a pipe connected to the hole. The liquid on the plate 12 is accumulated and is introduced to the area which is not applied to the electrode plate.

As described above, in the present invention, the weight of the food which is carried on the turntable in the heating chamber is converted to the change in the amount of thrust in the direction of the turntable shaft. The amount of change in thrust direction is converted to a change in the electrostatic capacity by changing the distance between the electrode plates disposed underneath the turntable shaft. The weight of food is measured based on the change in the electrostatic capacity. To prevent the liquid from contaminating the food weight measuring mechanism, one of the electrode plates is formed in a box-like shape having an opening on one side thereof, and the other of the electrode plates is stored in the cavity of the box-like electrode plate. Therefore, even when the liquid is deposited on the box-like electrode plate, the liquid does not flow and is not accumulated between the electrode plates. Further, this construction prevents fine dust from accumulating between the electrode plates. Accordingly, the weight measuring operation can be exactly carried out.

Because the liquid cut-off plate is provided on the turntable shaft, the liquid which is normally deposited on the upper electrode plate can be reduced.

Although all of the box-like electrode plate, the liquid cut-off plate, and the upper support plate having the water collection construction are provided in the embodiment of the present invention, one or more of them may be selectively provided.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A food weight measuring device comprising:
   table means for carrying a foodstuff;
   support means for supporting the table means;
   means for detecting the amount of change in a thrust direction of the support means responsive to the weight of the food;
   means for converting the amount of change in a thrust direction of the support means to an electrostatic capacity change, said means for converting comprises a first electrode means and a second electrode means, said second electrode means being disposed opposite to said first electrode means; and
   means for preventing liquid or dust from contaminating the converting means, said means for preventing comprises the first electrode means which extends over and covers the second electrode means.

2. The food weight measuring device of claim 1, wherein the first electrode is formed in a box-like shape having a cavity which opens in the lower direction and the second electrode is positioned in the cavity of the first electrode.

3. The food weight measuring device of claim 1, wherein the prevention means further comprises a liquid cut-off plate disposed on the support means between the table means and the converting means.

4. The food weight measuring device of claim 3, wherein the prevention means further comprises a liquid collecting, upper support plate provided on the support means between the liquid cut-off plate and the converting means.

5. The food weight measuring device of claim 4 operatively disposed in a microwave oven.

6. The food weight measuring device of claim 1, wherein the prevention means further comprises a liquid collecting, upper support plate provided on the support means between the table means and the converting means.

* * * * *